US007368000B2

(12) United States Patent
Jain et al.

(10) Patent No.: US 7,368,000 B2
(45) Date of Patent: May 6, 2008

(54) TREATMENT OF EFFLUENT GASES

(75) Inventors: Ravi Jain, Bridgewater, NJ (US); Julian Richard Dean, Burgess Hill (GB); Robert Bruce Grant, Steyning (GB); Naum Perelman, Gillette, NJ (US); Paul Alan Stockman, Hillsborough, NJ (US); Neil Condon, Worthing (GB); Andrew John Harpham, Copthorne (GB); William R. Gerristead, Jr., High Bridge, NJ (US)

(73) Assignee: The BOC Group plc (GB)

( * ) Notice: Subject to any disclaimer, the term of this patent is extended or adjusted under 35 U.S.C. 154(b) by 229 days.

(21) Appl. No.: 11/019,843

(22) Filed: Dec. 22, 2004

(65) Prior Publication Data

US 2006/0130649 A1    Jun. 22, 2006

(51) Int. Cl.
*B01D 53/02*   (2006.01)
(52) U.S. Cl. .................. 95/82; 95/45; 95/127; 96/101; 96/106; 96/4; 96/134
(58) Field of Classification Search ............. 95/82–88, 95/45, 127, 116; 96/101–107, 4, 134; 73/23.35–23.42; 422/89
See application file for complete search history.

(56) References Cited

U.S. PATENT DOCUMENTS 3,683,589 A * 8/1972 Seitz et al. .................... 95/26
3,890,121 A * 6/1975 Thomas ........................ 95/115
4,093,429 A * 6/1978 Siegler et al. ................ 95/105
4,238,204 A * 12/1980 Perry ............................ 95/55
4,444,572 A   4/1984 Avon et al.

(Continued)

FOREIGN PATENT DOCUMENTS

GB        1 181 310        2/1970

(Continued)

OTHER PUBLICATIONS

Wolfgang Theer, Abstract of DD 257996 A1, "Gas Chromatographic Sepn. of Krypton-Xenon Mixt.—Using Inter-Zone Carrier Gas Feed for Simultaneous Separate Desorption," Jul. 6, 1988; Dresden Komplette Chemieanlag.

(Continued)

*Primary Examiner*—Duane Smith
*Assistant Examiner*—Robert A Clemente
(74) *Attorney, Agent, or Firm*—David A. Hey

(57) ABSTRACT

A method is described for recovering a noble gas, such as xenon or krypton, from a first gas mixture comprising a plurality of components, one of which is the noble gas and the others are typically helium and/or nitrogen, argon, and relatively light fluorocarbons. The gas mixture is first conveyed to a gas chromatography column for separating the noble gas from the other components of the gas mixture. As the noble gas travels relatively slowly through the column, the other components are exhausted from the column before the relatively slow noble gas. Following the exhaust of these other components, a purge gas is supplied to the column to flush the noble gas therefrom. A second gas mixture comprising the noble gas and the purge gas is conveyed from the column to a membrane separator to separate the second gas mixture into a noble gas-rich gas stream and a purge gas-rich gas stream, which may be recirculated back to the column for re-use.

18 Claims, 11 Drawing Sheets

U.S. PATENT DOCUMENTS

| | | | |
|---|---|---|---|
| 4,562,000 | A | 12/1985 | Ringel |
| 4,747,854 | A * | 5/1988 | Maroulis et al. ............... 95/82 |
| 5,213,767 | A | 5/1993 | Smith et al. |
| 6,168,649 | B1 * | 1/2001 | Jensvold et al. ............... 95/47 |
| 2005/0235828 | A1 * | 10/2005 | Ishihara ....................... 95/131 |
| 2006/0107831 | A1 * | 5/2006 | Karwacki et al. ............. 95/116 |

FOREIGN PATENT DOCUMENTS

| | | | |
|---|---|---|---|
| GB | 1181310 A | * | 2/1970 |

OTHER PUBLICATIONS

Werner Mages and Karl Baur, Abstract of DD 19641643 A1, "Production of Pure Xenon in an Air Separation Plant," Apr. 16, 1998; Linde AG.

F. Wolf, Abstract of DD 106332 A1, "Sepn of Argon and Helium—From Gas Mix. Using Zeolite Molecular Sieve Type A Charged with Nitrile Cpd," Jun. 12, 1974.

United Kingdom Search Report of Application No. GB0503239.6; Date of search: Jun. 2, 2005.

* cited by examiner

TREATMENT OF EFFLUENT GASES

FIELD OF THE INVENTION

The present invention relates to the treatment of effluent gases, and in particular to the recovery of a noble gas from an effluent gas stream.

BACKGROUND OF THE INVENTION

A common requirement in integrated circuit fabrication is plasma etching of openings such as contacts, vias and trenches in dielectric materials formed on semiconductor substrates. With device geometries becoming increasingly smaller, there is a requirement to form deep and narrow openings with high aspect ratios. One suitable technique for forming such openings in silicon oxide is a plasma etching technique, in which a fluorocarbon etchant gas having the general formula $C_xF_yH_z$, where $x \geq 1$, $y \geq 1$ and $z \geq 0$, is supplied to a process chamber of a plasma etch reactor together with one more noble gases, which perform the dual roles of providing an inert carrier gas for the etchant gas and aiding fluorine in attacking the silicon oxide.

The use of xenon as one of the noble gases has been found to provide increased selectivity and reduced resist damage in comparison to a system using argon alone. However, as xenon occurs in atmospheric air in very low concentrations, its cost is very high (the current cost of xenon is around $4/sl) and its availability can be somewhat limited. Given that the estimated usage of xenon in a plasma etch reactor comprising four processing chambers is around 250,000 to 500,000 liters per annum, it is very desirable to recover and re-use expensive noble gases such as xenon and/or krypton which are contained within the effluent stream exhaust from the process tool.

The recovery of such a noble gas, or noble gas mixture, is, however, hampered by other components of the effluent stream. These can include: unconsumed reactants; by-products from the plasma etching; purge gas supplied to a pumping system for drawing the effluent stream from the chamber; and other noble gases.

Unconsumed fluorocarbon etchant is particularly undesirable, as such gases are known to have relatively high greenhouse activity.

SUMMARY OF THE INVENTION

In a first aspect, the present invention provides a method of recovering a noble gas from a gas mixture comprising a plurality of components, one of which is the noble gas, the method comprising the steps of supplying the gas mixture to a gas chromatography column for separating the components of the gas mixture and sequentially exhausting the components therefrom, and collecting the noble gas exhaust from the gas chromatography column.

In a second aspect, the present invention provides a method of recovering a noble gas from a first gas mixture comprising a plurality of components, one of which is the noble gas, the method comprising the steps of separating the noble gas from the other components of the first gas mixture within a first gas separator, exhausting the other components of the first gas mixture from the first separator, supplying a purge gas to the first gas separator to draw the noble gas from the first gas separator, conveying a second gas mixture comprising the noble gas and the purge gas from the first gas separator to a second gas separator, and separating a purge gas-rich gas stream from the second gas mixture at the second gas separator.

In a third aspect, the present invention provides use, in a system for recovering a noble gas from a gas mixture, of a gas chromatography column to separate the noble gas from the gas mixture.

In a fourth aspect, the present invention provides apparatus for recovering a noble gas from a gas mixture comprising a plurality of components, one of which is the noble gas, the apparatus comprising a gas chromatography column for separating the components of the gas mixture and sequentially exhausting the components therefrom, and means for collecting the noble gas exhaust from the gas chromatography column.

In a fifth aspect, the present invention provides apparatus for recovering a noble gas from a first gas mixture comprising a plurality of components, one of which is the noble gas, the apparatus comprising first separating means for separating the noble gas from the other components of the first gas mixture and exhausting the other components of the gas mixture; means for supplying a purge gas to the first separating means to draw the noble gas from the first separating means; and a second separating means for receiving a second gas mixture comprising the noble gas and the purge gas from the first separating means and separating a purge gas-rich gas stream from the second gas mixture.

BRIEF DESCRIPTION OF THE DRAWINGS

Preferred features of the present invention will now be described with reference to the accompanying drawings, in which.

DETAILED DESCRIPTION OF THE INVENTION

Figure 1:
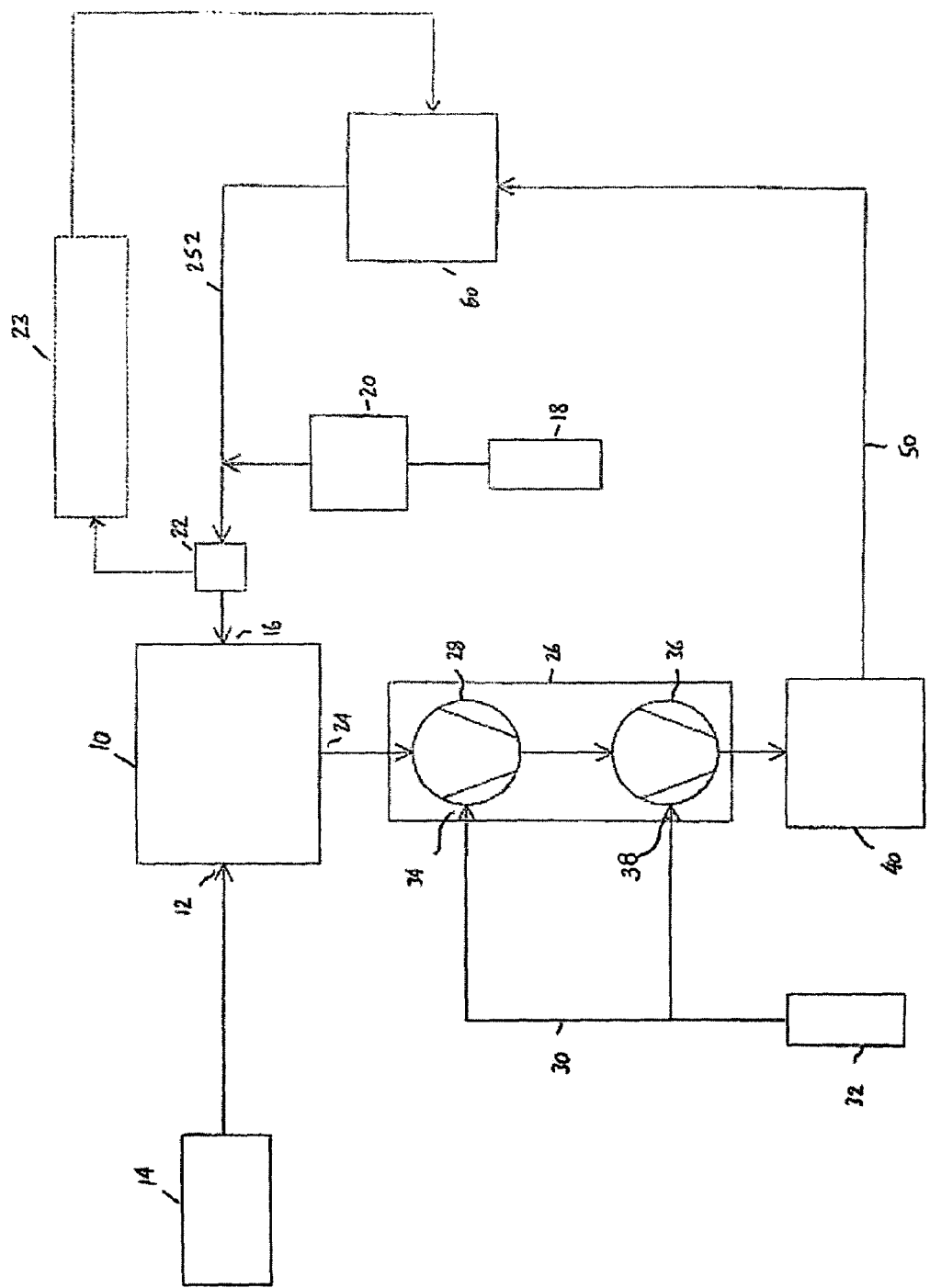
FIG. 1 illustrates schematically one example of a system incorporating a gas recovery system.

The gas recovery system illustrated in the drawings is provided for use in recovering a noble gas contained within an effluent stream exhaust from a process chamber of a plasma etch reactor. However, the invention is not limited to such a purpose. For example, aspects of the invention also find use in the recovery of xenon when used as an anaesthetic for surgery, by separating xenon from the gas exhaled by a patient, and when used as a source for the generation of extreme ultra violet (EUV) radiation, by separating xenon from purge gases supplied to a pumping system used to pump xenon from a plasma chamber and from other contaminants within the gas stream pumped from the chamber.

While the examples described below relate to the recovery of xenon, the invention is also suitable for the recovery of other gases, such as krypton and a mixture of xenon and krypton. The recovered gas may be re-used "as is", or it may be mixed with another gas prior to re-use. For example, the recovered noble gas may be mixed with fresh argon prior to re-use. The term "noble gas" used herein is not limited to a single gas, but also includes a mixture of two or more noble gases.

Referring to FIG. 1, a process chamber 10 of a plasma etch reactor is provided with at least one first inlet 12 for receiving process gases from gas sources indicated generally at 14 in FIG. 1. A mass flow controller may be provided for each respective gas, the mass flow controllers being controlled by a system controller to ensure that the required amount of gas is supplied to the process chamber 10. In this example, the process gases comprise an etchant and oxygen as reactants for the process being conducted in the process chamber 10, together with helium and argon. Examples of suitable etchant include the perfluorocompounds having the general formula $C_xF_y$ where $x \geq 1$ and $y \geq 1$, such as $CF_4$, $C_2F_6$, $C_3F_8$, and $C_4F_8$, although other etchants including hydrofluorocarbon gases, such as $CHF_3$, $C_2HF_5$ and $CH_2F_2$, fluorine, $NF_3$, $SF_6$, or any other suitable halogen-containing component, such as $Cl_2$ or HBr, could also be used. Helium is generally supplied to the process chamber 10 in relatively small amounts to cool the back surface of the wafer. Argon provides a facilitating gas for the process being conducted in the process chamber 10.

The plasma etch reactor may be any suitable reactor for generating a plasma for etching the surface of a substrate located therein to a desired geometry. Examples include an inductively coupled plasma etch reactor, an electron cyclotron resonance (ECR) plasma etch reactor, or other high-density plasma reactor. In this example, the plasma etch reactor is a reactor in which a semiconductor manufacturing process takes place, and so the surface of the substrate may comprise a polysilicon or a dielectric film. Alternatively, the manufacture of flat panel displays may take place within the plasma etch reactor.

The process chamber 10 is provided with a second inlet 16 for receiving a noble gas such as krypton, xenon, or a mixture of krypton or xenon. In the illustrated example, the noble gas is xenon. The xenon is provided from a xenon supply 18, which can comprise one or more gas cylinders which provide xenon to a buffer tank 20 from which xenon is supplied to the second inlet 16 through a mass flow controller 22 under the control of the system controller. As shown in FIG. 1, the mass flow controller 22 issues a signal indicative of its current setting to a recirculation system controller 23.

An effluent gas stream is drawn from the outlet 24 of the process chamber 10 by a pumping system indicated at 26 in FIG. 1. During the etching process, only a portion of the reactants will be consumed, and so the effluent gas stream exhaust from the outlet 24 of the process chamber 10 will contain a mixture of the reactants, the unreactive noble gases supplied to the chamber, and by-products from the etch process. For example, the effluent stream may contain a mixture of $C_xF_y$, $O_2$, Xe, Ar, He, $SiF_4$, and one or both of CO and $CO_2$.

The pumping system 26 comprises a turbomolecular pump 28 for drawing the effluent stream from the process chamber 10. Xenon molecules are "heavy" by comparison to lighter gases and therefore move more slowly through the turbomolecular pump 28. As work is being done on the heavy xenon molecules, their internal energy is increased and heat is produced. As the metal impeller of the turbomolecular pump 28 has a high thermal conductivity, this heat is conducted through the impeller rapidly whilst the stator component of the turbomolecular pump 28 remains cold. To prevent the pump from being damaged whilst pumping xenon, a purge gas lighter than xenon, such as helium or, as in this example, nitrogen, is supplied to the turbomolecular pump 28 via a conduit system 30 connecting a source 32 of the purge gas with a purge port 34 of the turbomolecular pump 28. On average, lighter gas molecules such as $N_2$ and He travel faster than Xe, and so these gases have a higher impingement rate on the impeller. As these gases also have a higher thermal conductivity than Xe, the molecules of purge gas draw heat from the pump impeller. This can maintain the temperatures inside the turbomolecular pump 28 at levels that allow reliable pump operation for much longer periods than would be possible in the absence of such a purge gas.

The turbomolecular pump 28 can generate a vacuum of at least $10^{-3}$ mbar in the process chamber 10. The effluent stream is typically exhausted from the turbomolecular pump 28 at a pressure of around 1 mbar. In view of this, the pumping system 26 also comprises a backing pump 36 for receiving the effluent stream exhaust from the turbomolecular pump 28 and raising the pressure of the effluent stream to a pressure, in this example, slightly above ambient. The backing pump 36 also receives purge gas from the conduit 30 via purge port 38 to prevent damage to the pumping mechanism of the backing pump 36.

The effluent stream exhaust from the backing pump 36 thus now contains, in addition to gas exhaust from the process chamber 10, $N_2$. In order to remove some of the components from the effluent stream, the effluent stream is subsequently conveyed through an abatement device 40. The abatement device 40 may take any desired form, such as an incineration, plasma abatement or thermal decomposition unit, for removing desired components from the effluent stream. As an alternative to locating the abatement device 40 downstream from the backing pump 36, it may be more desirable to locate the abatement device 40 between the turbomolecular pump 28 and the backing pump 36; depending on the nature of the abatement device 40, it may be more efficient to operate the abatement device 40 at a sub-atmospheric pressure rather than at the elevated pressure of the effluent stream exhaust from the backing pump 36.

Due to the presence of a relatively large proportion of purge gas within the effluent stream in comparison to the $C_xF_y$ components, the energy requirement to remove the more stable $C_xF_y$ components, such as $CF_4$ and $C_2F_6$, from the effluent stream using a plasma abatement technique is relatively high. In addition, an atmospheric pressure plasma abatement unit would require relatively precise and complex configuration for a particular gas load and throughput. Due also to the requirement to provide a fuel gas for burning the effluent stream within a thermal decomposition unit, in the illustrated example the abatement device 40 is provided in the form of a gas reactor column for removing $SiF_4$ and the more reactive $C_xF_y$ components from the effluent stream. An example of a suitable gas reactor column is described in U.S. Pat. No. 5,213,767, the contents of which are incorporated herein by reference. In overview, a gas reactor column contains a number of heated beds of material selected for the removal of particular components from the effluent stream. In this example, the gas reactor column contains at least two heated stages, which may be conveniently provided within removable cartridges surrounded by an electrically heated furnace. A first stage contains heated granules of silicon for preheating the effluent stream and converting the more reactive $C_xF_y$ components into $F_2$ and C, which either falls from the column in the form of soot or is converted into CO and $CO_2$ by the $O_2$ present within the effluent stream. A second stage contains heated calcium oxide, preferably in the form of lime, for converting $SiF_4$ into $CaF_2$ and $SiO_2$, and $F_2$ into $CaF_2$. The relatively unreactive gases in the effluent stream, namely, in this example, the noble gases He, Ar and Xe, $N_2$ purge gas, the more stable $C_xF_{2x+2}$ components, such as $CF_4$ and $C_2H_6$, CO and/or $CO_2$ pass through the gas reactor column unchanged.

Figure 2:
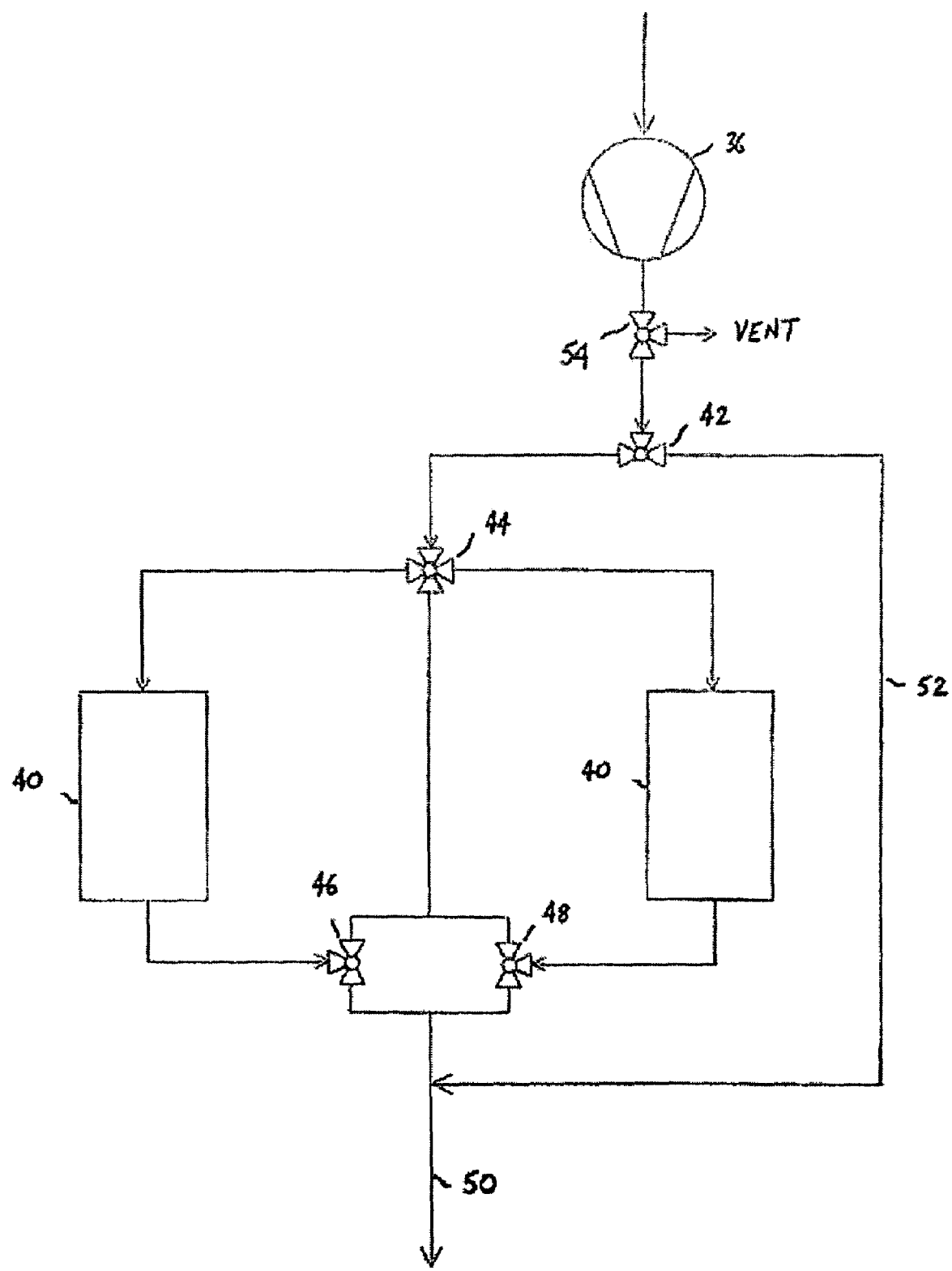
FIG. 2 illustrates schematically one example of an abatement system for gas exhaust from the process chamber of the system shown in FIG. 1.

While a single abatement device 40 may be provided, as illustrated in FIG. 2 two or more similar abatement devices 40 may be provided in parallel. For example, where two gas reactor columns are provided, one or more valves 42, 44 may be disposed between the backing pump 36 and the gas reactor columns to enable the effluent stream exhaust from the backing pump 36 to be directed to one gas reactor column while the other gas reactor column is off-line, for example for replacement of one or more of the cartridges, or being subject to a purge using, for example, nitrogen gas. This enables the effluent stream to be continuously treated. In this case, an arrangement of one or more valves 46, 48 is also provided downstream from the gas reactor columns to connect the outputs from the gas reactor columns to an inlet gas conduit 50 of a gas recovery system 60, which is described in more detail below. A by-pass conduit 52 may also be provided to allow the effluent stream exhaust from the backing pump 36 to be diverted to the gas conduit 50 without passing through a gas reactor column, for example, when the effluent stream contains no components that would be removed by the gas reactor column. Unless otherwise stated, the recirculation system controller 23 controls the operation of all valves and valve arrangements by issuing appropriate signals thereto.

As discussed above, the effluent stream exhaust from the abatement device 40 typically contains, in this example, He, Xe, Ar, $N_2$, one or more $C_xF_{2x+2}$ components, and one or both of $CO_2$ and CO. In view of the high cost of xenon, a gas recovery system 60 for recovering the xenon from the effluent stream is provided to enable the recovered xenon to be recirculated back to the process chamber 10 for re-use. In the event that xenon is not contained in the effluent stream exhaust from the process chamber 10, for example, when a process is being conducted in the process chamber 10 that does not require the presence of xenon, a three-way valve 54 is provided to enable the effluent stream to be diverted to an alternative gas treatment system. As illustrated in FIG. 2, the three-way valve 54 may be located between the pumping system 26 and the abatement device 40 so that the effluent stream can be passed to the alternative gas treatment system without passing through the abatement device 40. This alternative gas treatment system may include a more efficient abatement device for removing the $C_xF_y$ components from the effluent stream in the absence of xenon and, therefore, any purge gas that would otherwise be supplied to the pumping system 26.

Figure 3:
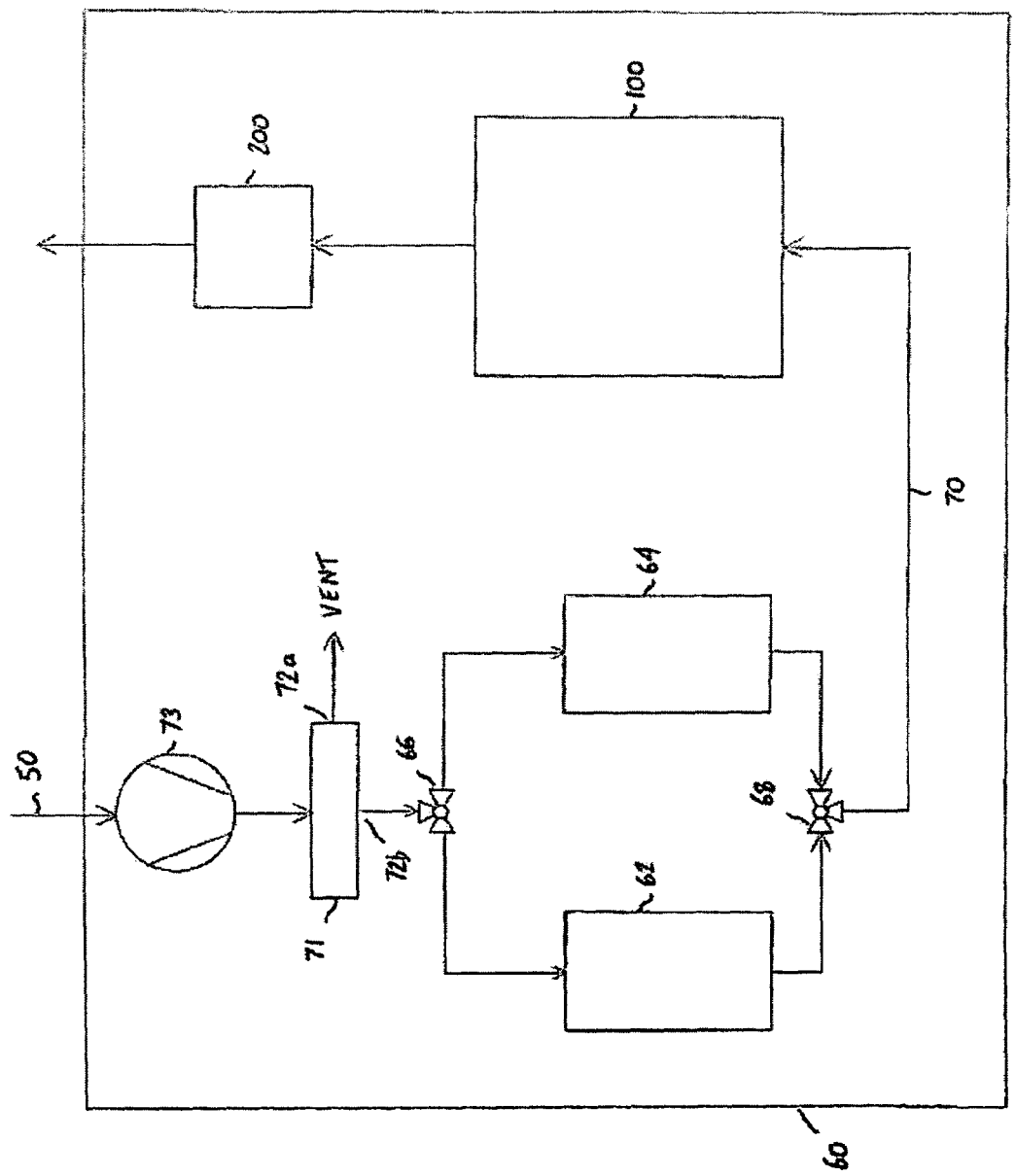
FIG. 3 illustrates schematically a first example of a gas recovery system.

An example of a gas recovery system 60 for use with the system of FIG. 1 is shown in more detail in FIG. 3.

The gas recovery system 60 comprises at least two gas storage vessels 62, 64 for receiving the effluent stream. A valve 66 is provided upstream from the storage vessels 62, 64 for selectively connecting one of the storage vessels to the inlet gas conduit 50, and a valve 68 is provided downstream from the storage vessels 62, 64 for selectively connecting one of the storage vessels to an outlet gas conduit 70 for conveying the effluent stream away from the storage vessels 62, 64. The recirculation system controller 23 controls the valves 66, 68 to toggle between the storage vessels 62, 64 so that when one of the storage vessels 62 is connected to the inlet gas conduit 50, the other storage vessel 64 is connected to the outlet gas conduit 70. In other words, the valves 66, 68 are controlled so that as one of the storage vessels 62 is being supplied with gas, the other storage vessel 64 is being emptied of gas. When the storage vessel 62 is full, or following the expiry of a predetermined time period, the valve 66 is switched so that the other storage vessel 64 is instead supplied with gas, and the valve 68 is switched so that the storage vessel 62 is now emptied of gas. One effect of this is that a continuous (or, depending on the manner in which the gases are supplied to the process chamber, sporadic) gas stream entering the gas recovery system 60 is converted into a batch gas supply for the remainder of the gas recovery system 100, 200 shown in FIG. 3 (as gas is supplied to the remainder of the gas recovery system 100, 200 from storage vessels 62, 64 in turn).

As shown in FIG. 3, a pre-concentrator 71 may be provided upstream from the valve 66 for concentrating the amount of xenon within the effluent stream prior to storage in the storage vessels 62, 64. In the illustrated example, the pre-concentrator 71 is in the form of a membrane separator for separating at least the xenon within the effluent stream from one or more of the other components of the effluent stream. For example, the separator 71 may be configured to separate the majority of the nitrogen within the effluent stream from the remainder of the effluent stream, so that a nitrogen-rich gas stream is output from a first outlet 72a of the separator 71 for venting to the atmosphere, and a nitrogen-lean gas stream is output from a second outlet 72b of the separator 71 towards the valve 66.

Two alternative arrangements for the storage vessels 62, 64 will now be described.

In a first arrangement, which is illustrated in FIG. 3, the storage vessels 62, 64 are pressure vessels for storing gas. In order to increase the storage capacity of the pressure vessels, a compressor 73 is preferably provided upstream from the valve 66 for compressing the effluent stream prior to supply to the storage vessels. Where a membrane separator 71 is provided, the compressor 73 can provide a suitable pressure differential across the membrane. Depending on the respective mass flow rates at which gas enters and leaves each storage vessel 62, 64, only one of the storage vessels 62, 64 may be required, and so the valves 66, 68 may be set so that gas enters and leaves a single vessel at all times. In this case, the storage vessel 64 may be omitted altogether.

Figure 4:
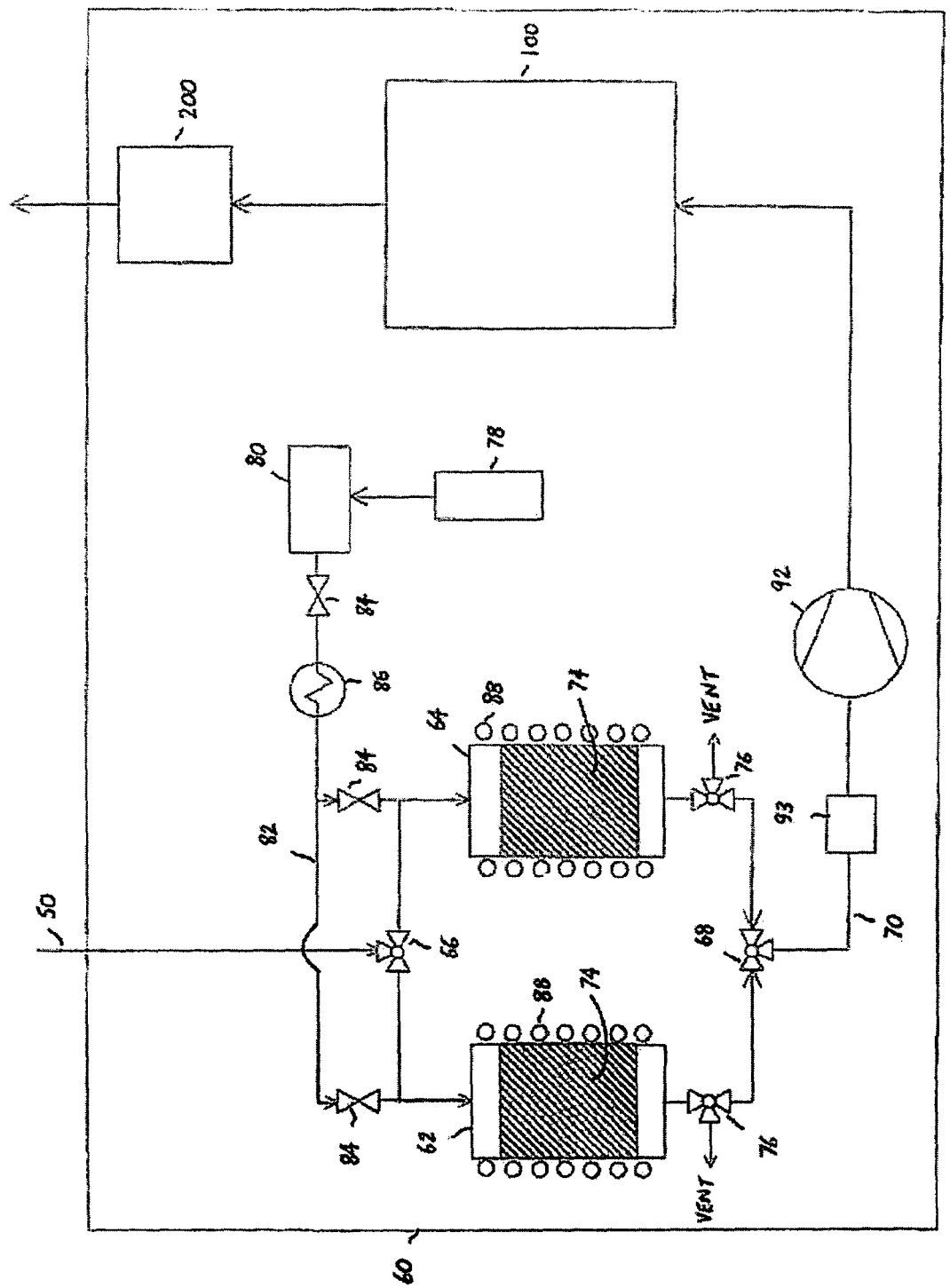
FIG. 4 illustrates schematically a second example of a gas recovery system.

In a second arrangement, which is illustrated in FIG. 4, the storage vessels 62, 64 contain adsorbent material 74 for adsorbing at least xenon from the components of the gas stream entering the storage vessels. In this arrangement, the storage vessels 62, 64 contain adsorbent material 74 that does not preferentially adsorb the $N_2$ purge gas or He gas present in the effluent stream, but instead preferentially adsorbs the other components of the effluent stream. One suitable adsorbent material is activated carbon, which provides a very large surface area for a given volume of activated carbon, and therefore provides numerous sites for adsorbing components of the effluent stream whilst permitting a significant amount of the $N_2$ purge gas (and also the relatively small amount of He gas supplied to the process chamber 10) to pass through the activated carbon. In general, the greater the surface area of the adsorbent material 74, then the greater the amount of gas that can be stored in the storage vessels 62, 64. The He and $N_2$ that is not adsorbed by the adsorbent material 74 can be discharged from the storage vessel 62, 64 using a suitable valve 76 provided downstream from the outlet of each storage vessel.

In this arrangement, the backpressure of the gas exhaust from the backing pump 36 drives the effluent stream into the storage vessels 62, 64. However, similar to the first arrangement, an additional compressor 73 may be provided upstream from the valve 66 for driving the effluent stream into the storage vessels 62, 64.

The use of adsorbent material 74 thereby increases the xenon capacity of the storage vessels 62, 64 without the requirement for the compressor 72 of the first arrangement, and also concentrates the xenon within the adsorbed effluent stream.

In order to empty the storage vessels 62, 64 in this second arrangement, the adsorbent material 74 requires regenerative treatment to desorb the adsorbed gases. Any one or more of the following treatments may be performed to desorb the adsorbed gases from the adsorbent material 74: increase the temperature of the adsorbent material; reduce the pressure in the storage vessel; and purge the storage vessel with a suitable regenerative purge gas.

In the illustrated arrangement, when one of the storage vessels 62, 64 is to be emptied, a regenerative purge gas is conveyed to the storage vessel. The purge gas is preferably a low molecular weight gas. In the illustrated example, the purge gas is helium, although hydrogen could be used instead provided that the hydrogen does not react with any of the components of the effluent stream under the various operating conditions (for example, temperature and pressure) within the gas recovery system 60.

The helium purge gas is provided from a helium supply 78, which is this example comprises a source of high purity helium that supplies helium to a pressurised buffer tank 80 from which helium is supplied to a helium supply conduit 82. The helium supply conduit 82 supplies a controlled amount of helium to the storage vessels 62, 64 through a valve 84. The recirculation system controller 23 controls the valve 84 synchronously with the valve 66, 68 such that helium is supplied to the storage vessel from which gases are to be desorbed and not to the storage vessel in which gases are currently being adsorbed.

Figure 5:
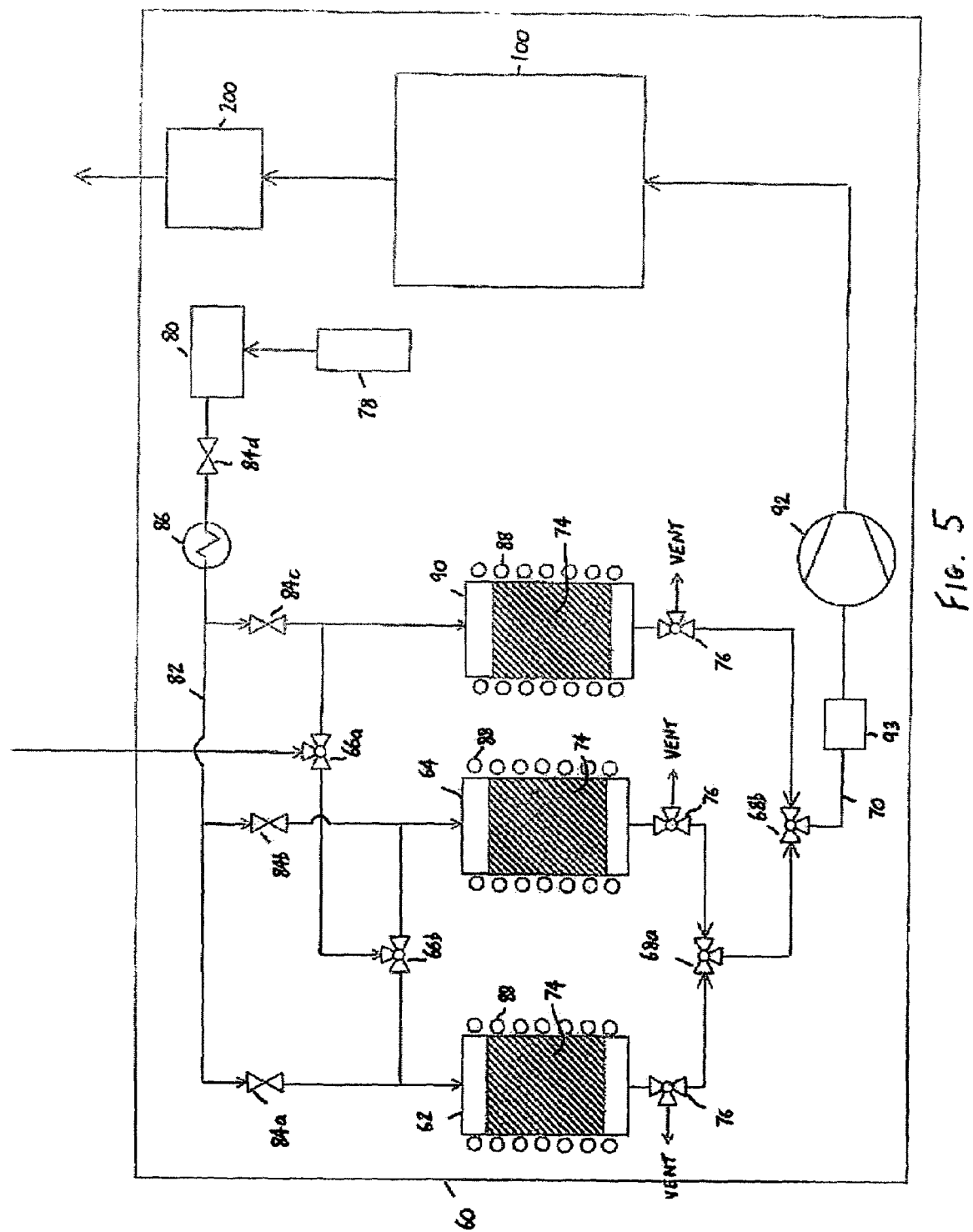
FIG. 5 illustrates schematically a third example of a gas recovery system.

In addition to purging the storage vessels 62, 64 to regenerate the adsorbent material 74, the temperature of the adsorbent material 74 may be increased to regenerate the adsorbent material 74. For example, the purge gas may be heated using a gas heater 86 surrounding, or located within, part of the helium supply conduit 82. Alternatively, a heating jacket 88 may be located about each of the storage vessels 62, 64 to heat the adsorbent material 74 from which gas is to be desorbed. This provides the option of regenerating the adsorbent material 74 by increasing the temperature of the adsorbent material 74 alone. As shown in FIG. 5, an additional storage vessel 90, similar to the other storage vessels 62, 64, may be advantageously provided, with the valves 66, 68 and 84 being replaced by valves 66a, 66b, 68a, 68b, 84a, 84b, 84c, 84d to toggle the effluent stream and the helium purge gas between the three storage vessels 62, 64, 90 such that, at any given moment, the effluent stream is being supplied to a first one of the storage vessels whilst a second one of the storage vessels is being heated to regenerate the adsorbent material and a third one of the storage vessels is being cooled in readiness for receiving the effluent stream.

As illustrated in FIGS. 4 and 5 a compressor 92 may be provided in fluid communication with the gas outlet conduit 70 for reducing the pressure in the storage vessel 62, 64 either in isolation from, or in combination with, heating the adsorbent material 74 and/or conveying a purge gas through the storage vessels 62, 64 Where a compressor 92 is provided, a back pressure regulator 93 may be provided for controlling the pressure within the storage vessels 62, 64.

Thus, the effluent stream output from one of the storage vessels in any of the arrangements described above contains Xe, Ar, one or more $C_xF_{2x+2}$ components, and one or both of $CO_2$ and CO. Where the storage vessels are pressure vessels containing no adsorbent material, as in the first arrangement described above, the effluent stream will additionally comprise some $N_2$ purge gas (the relative amount depending on whether a membrane separator 71 is used) and He. As the effluent stream is compressed prior to entering the pressure vessels, the gas is conveyed within the gas outlet conduit 70 under a pressure difference existing between the ends of the gas outlet conduit 70. When the storage vessels 62, 64 contain activated carbon as an adsorbent material, the gas is conveyed within the gas outlet conduit 70 under a pressure difference existing between the pressurised buffer tank 80 and the outlet end of the gas outlet conduit 70, or under the pumping action of compressor 92. Depending on the technique used to regenerate the activated carbon, the effluent stream may additional include He.

Figure 6:
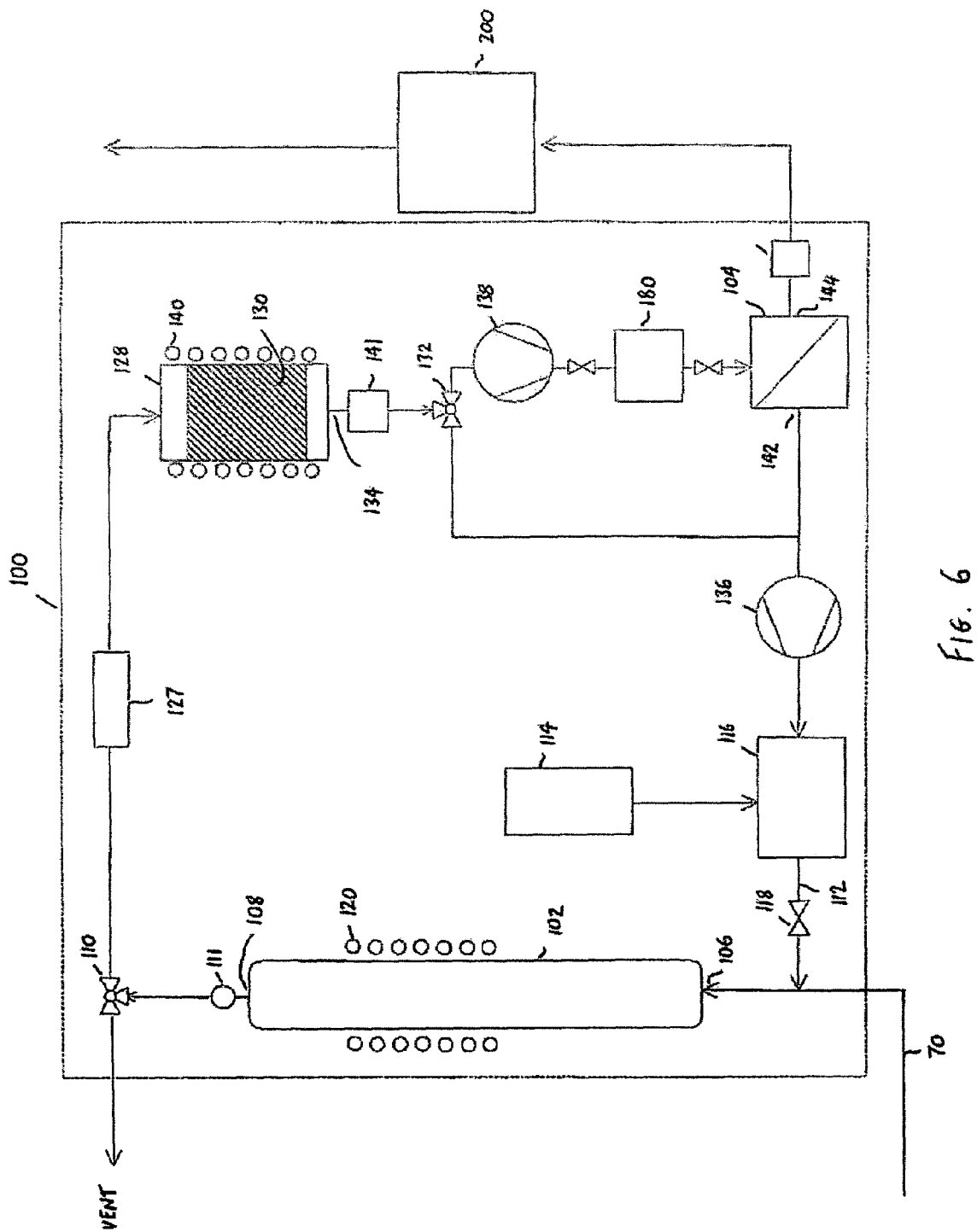
FIG. 6 illustrates schematically a first example of a gas separation system of the gas recovery system of any of FIGS. 3 to 5.

The effluent stream is conveyed by outlet gas conduit 70 to a gas separation system 100 for separating the xenon gas from the other gases contained in the effluent stream. As illustrated in FIG. 6, the gas separation system 100 comprises a first gas separator 102 and a second gas separator 104.

The first gas separator 102 performs the function of separating the xenon from the other components of the effluent stream. In the illustrated example, the first gas separator 102 is a heated gas chromatography column that receives the effluent stream at an inlet 106 thereof. As is known, a gas chromatography column separates components of a gas by virtue of the different speeds at which the components pass through the column. Gas chromatography columns are well known in the art, and therefore will not be described in detail here. The rate at which a component travels through a particular gas chromatography column is dependent upon a number of factors, including: the chemical and physical properties of the components—relatively large molecules travel through the column slower than relatively smaller molecules; the temperature of the column—raising the column temperature speeds up all of the components passing therethrough; the length of the column—increasing the length of the column improves the separation of the components; the flow rate of the gas through the column—decreasing the flow rate decreases the speed at which all of the components pass through the column; and the composition of the column.

From the above list, the factors that influence most greatly the separation of the components within the gas are the chemical and physical properties of the components. Xenon molecules have a relatively large size in comparison to that of the other components of the effluent stream. In addition, as xenon is a large molecule having outer electron rings a relatively long distance from its nucleus, xenon has a high electron affinity and so molecules of xenon tend to become temporarily held within the column under weak Van der Waals forces. As a result, xenon diffuses through the packed bed of the column 102 much slower than many of the other components of the effluent stream. For example, of the possible components of the effluent stream, He, Ar, $O_2$, $N_2$, $CF_4$ and $CO_2$ would diffuse through the column 102 quicker than Xe, and $C_2F_6$ would diffuse through the column 102 slower than Xe.

The temperature and size of the column 102, and the flow rate of the effluent stream into the column 102, are therefore configured such that many of the other components pass out from the outlet 108 of the column 102 whilst the xenon is still retained within the column 102. These factors are preferably configured so that the size of the column 102 is minimised, and so that the time taken for the other components to be output from the column 102, and therefore the time taken to separate xenon from the other components of the effluent stream, is also minimised.

Depending on the nature of the components within the gas output from the outlet 108 of the column 102 whilst the xenon remains within the column 102, this gas can be either conveyed to a gas treatment system using a three-way valve 110, for example, for removing the $C_xF_{2x+2}$ components from the gas output from the outlet 108, or vented to the atmosphere.

Once the "faster" components of the effluent stream have been exhaust from the column 102, which may be detected using a suitable detector 111 located proximate the outlet 108 of the column 102, the "slower" xenon is extracted from the column 102. In the illustrated arrangement, helium (or hydrogen) purge gas is supplied to the column 102 from a second helium supply conduit 112 connected to a source 114 of high purity helium that supplies a controlled amount of helium to a pressurised buffer tank 116 from which helium is supplied to the helium supply conduit 112. As illustrated in FIG. 6, the second helium supply conduit 112 supplies a pressurised stream of purge gas to the inlet 106 of the column 102 through a valve 118 in order to flush the xenon from the column 102. If required, some helium may also be supplied together with the effluent stream to provide a carrier gas for the mixture of gases entering the column 102.

Figure 7:
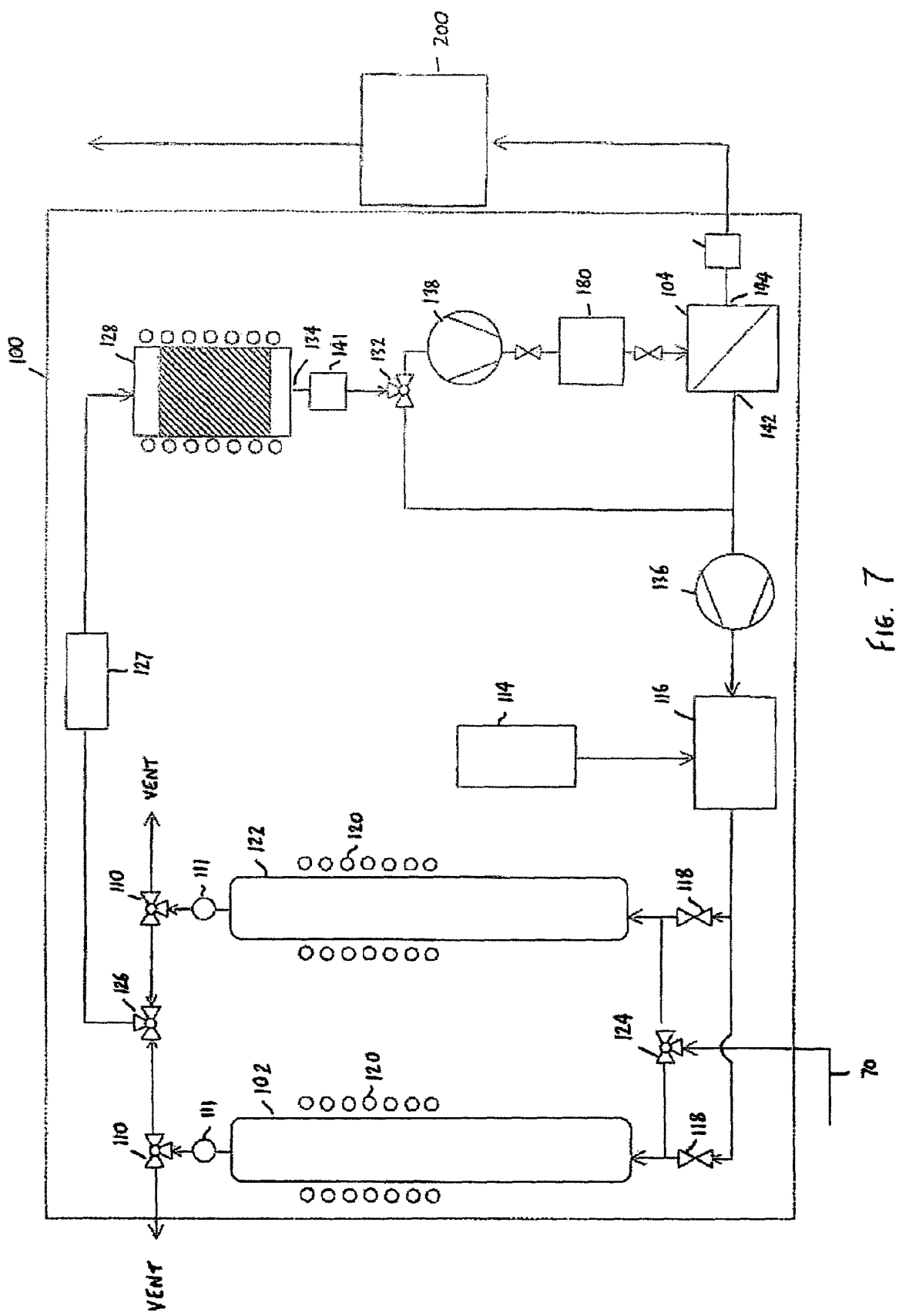
FIG. 7 illustrates schematically a second example of a gas separation system of the gas recovery system of any of FIGS. 3 to 5.

In order to heat the column, a heater 120 extends about at least part of the column 102. In normal use, the column 102 is heated to a temperature of around 200° C. Increasing the temperature of the column 102 further may be used as a technique for regenerating the packed bed of the column. In this case, as illustrated in FIG. 7 a second column 122 may be provided in parallel with the first column 102 so that as one column is heated to a temperature above 200° C. to regenerate the column, the other column is being cooled to 200° C. in preparation for receiving the effluent stream from the conduit 70. Suitable valves 124, 126 are located upstream and downstream from the columns 102, 122 to enable the gas stream to be selectively conveyed to one of the columns, and to enable a gas mixture of xenon and helium output from one of the columns to be conveyed towards the second separator 104, respectively.

Returning to FIG. 6, during the flushing of the column 102 with purge gas, the three-way valve 110 (or, in FIG. 7, the three-way valve 126) is switched to direct a gas mixture of helium and xenon exhaust from the column 102 to a storage vessel 128. A heat exchange mechanism 127 may be provided between this three-way valve and the storage vessel 128 to cool the gas mixture exhaust from the column 102 prior to entering the storage vessel 128. The flow rate of the purge gas into the column 102 is selected such that xenon can be flushed from the column in isolation from other "slower" components of the effluent stream, such as $C_2F_6$ where present. In this case, once the xenon has been flushed from the column 102, which may be detected using the detector 111, the three-way valve 110 is switched to re-direct the gas output from the outlet 108 of the column 102 back to the gas treatment system to enable the $C_2F_6$ and any other slower components of the gas output from the outlet 108 to be treated.

The storage vessel 128 contains adsorbent material 130 for preferentially adsorbing the xenon from the gas mixture whilst permitting a significant amount of the helium gas to pass therethrough. One suitable adsorbent material is activated carbon. A valve 132 connected to the outlet 134 from the storage vessel 128 directs the helium exhaust from the storage vessel 128 back to the pressurised buffer tank 116 via a suitable compressor 136. As a result, the helium exhaust from the storage vessel can be recirculated back to the column 102 for re-use in flushing xenon from the column 102. Furthermore, any unadsorbed xenon that is exhaust from the storage vessel 128 with the helium gas is not lost from the gas recovery system 60, but is instead retained within the gas recovery system 60.

Once the helium has been exhausted from the storage vessel 128, the valve 132 is switched to connect the outlet from the storage vessel 128 to the second separator 104. The pressure in the storage vessel 128 is reduced using a compressor 138 to desorb gas from the adsorbent material 130. As shown in FIG. 6, a heater 140 may be provided about the storage vessel 128 for heating the adsorbent material 130 to assist in the regeneration of the adsorbent material for gas desorption. In this case, two storage vessels may be provided, similar to the storage vessels illustrated in FIG. 4, for receiving the gas stream from the column 102 in turn, so that as one storage vessel is being heated to desorb gas from the adsorbent material, the other storage vessel is being cooled in preparation for receiving the gas stream from the column 102. A backpressure regulator 141 is provided between the storage vessel 128 and the compressors 136, 138 to control the pressure within the storage vessel 128.

The gas exhaust from the compressor 138 will thus contain predominantly xenon, but will also include an amount of helium, typically around 10% He, adsorbed by the adsorbent material 130 within the storage vessel 128. This gas mixture is conveyed from the compressor 138 at a pressure greater than atmospheric pressure, typically between 5 and 10 bar, to a storage tank 180, from which the gas mixture is exhaust to the second gas separator 104. In a preferred arrangement, the second gas separator 104 comprises a membrane device. Alternatives to the use of a membrane device 104 as the second separator include a cryogenic separator for separating the xenon from the other gases due to the differences between the melting and boiling points of the gases. The membrane device is preferred due to the lower costs associated with the purchase and operation of this separator over the other devices mentioned above.

The membrane device 104 contains a semi-permeable membrane through which one of the components of the gas mixture selectively permeates. In this example, the membrane is a polymeric material, examples of which are described in U.S. Pat. No. 6,168,649. The gas mixture is brought into contact with the membrane. The elevated pressure of the gas exhaust from the storage tank 180 provides a pressure differential across the membrane. The helium molecules within the gas mixture permeate through the membrane more rapidly than the xenon molecules. This provides a first gas stream on the higher-pressure side of the membrane which is depleted of helium, and typically contains less than 0.5% He. A second, helium-enriched gas stream is obtained on the lower-pressure side of the membrane. The second gas stream is conveyed from a first outlet 142 of the membrane device 104 back to the pressurised buffer tank 116 so that the helium exhaust from the storage vessel can be exhaust back to the column 102 for re-use in flushing xenon from the column 102. Furthermore, any unadsorbed xenon that is exhaust from the membrane device 104 with the helium gas is not lost from the gas recovery system 60, but is instead retained within the xenon recovery system 60.

Figure 8:
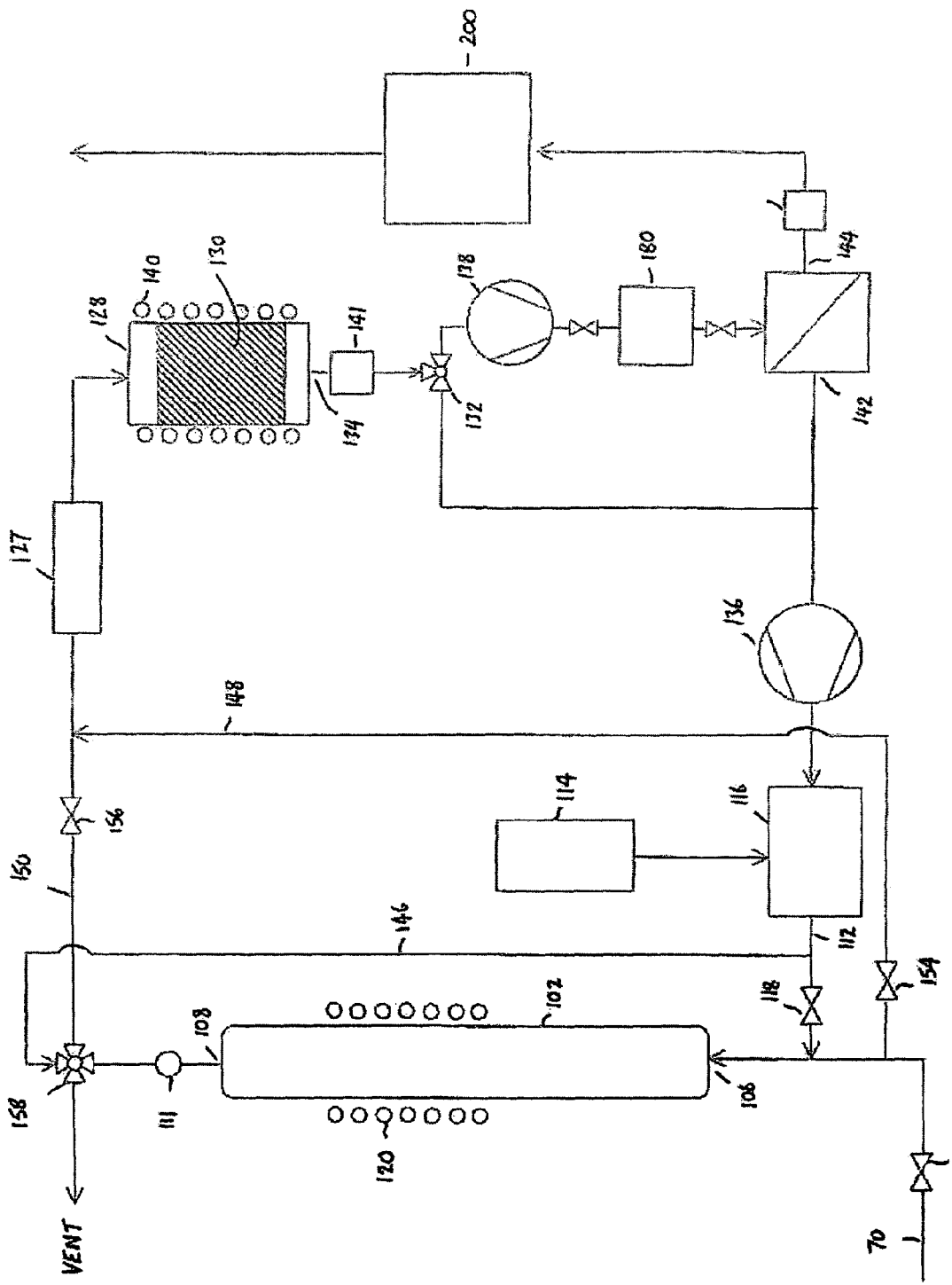
FIG. 8 illustrates schematically a third example of a gas separation system of the gas recovery system of any of FIGS. 3 to 5.

In the examples shown in FIGS. 6 and 7, the purge gas is supplied to the inlet 106 of the column 102. However, depending on the speed at which the xenon molecules migrate through the column 102, and when $C_2F_6$ is not also present within the column 102, it may be quicker to purge the column 102 by supplying the purge gas to the outlet 108 of the column 102 to "back flush" the xenon from the column 102. An arrangement that supplies the purge gas to the outlet of the column 102 is illustrated in FIG. 8. In this arrangement, the gas separation system 100 comprises a first helium supply conduit 112 for supplying helium to the inlet 106 of the column, and a second helium supply conduit 146 for supplying helium to the outlet 108 of the column 102. The system 100 further comprises a first binary gas conduit 148 for conveying a binary gas from the inlet 106 of the column 102 to the storage vessel 128, and a second binary gas conduit 150 for conveying a binary gas from the outlet 108 of the column 102 to the storage vessel 128. In use, valve 152 in the gas conduit 70 is opened, and valve 118 in the first helium supply conduit 112, valve 154 in the first binary gas conduit 148, and valve 156 in the second binary gas conduit 150 are closed so that the effluent stream is conveyed from the gas conduit 70 through the inlet 106 of the column 102. The valve arrangement 158 is initially switched so that the faster gases from the effluent stream are vented to the atmosphere, or directed to a gas treatment system, as required. To flush the xenon from the outlet 108 of the column 102, valves 152, 154 are closed, valve 156 is opened, and valve arrangement 158 is switched to direct the binary gas mixture to the second binary gas conduit 150. To flush the xenon from the inlet 106 of the column 102, valves 118, 152, 156 are closed, valve 154 is opened, and valve arrangement 158 is switched to direct purge gas into the outlet 108 of the column, so that a binary gas mixture is exhaust from the inlet 106 of the column 102 and conveyed through the first binary gas conduit 148 to the storage vessel 128. This arrangement is thus suitably for flushing xenon from the column 102 in any preferred direction. For example, in order to periodically clean the column 102, and thus remove any xenon trapped within the bed of the column 102 or at either the inlet 106 or the outlet 108 of the column 102, purge gas can be conveyed in either direction through the column 102 to the storage vessel 128, and then from the outlet 134 of the storage vessel 132 to the buffer tank 116. In this manner, any xenon remaining in the column 102 is, again, retained within the gas recovery system 60. As an alternative to passing the purge gas through the storage vessel 128, a by-pass conduit may be provided for conveying the purge gas directly from the first binary gas conduit 148 to the compressor 136 for return to the buffer tank 116.

Figure 9:
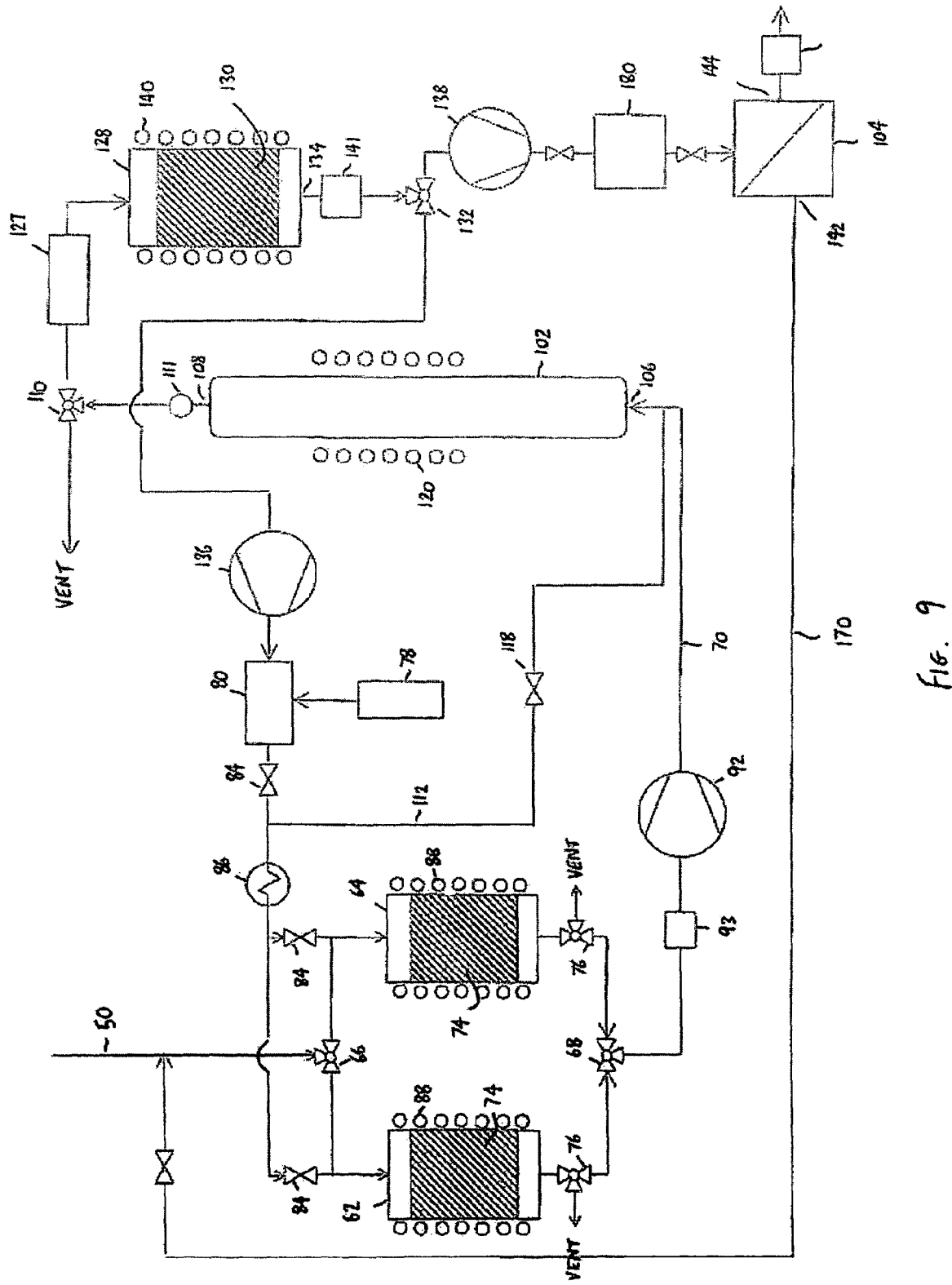
FIG. 9 illustrates schematically an example of a gas recovery system using a single purge gas supply for supplying purge gas to various components of the gas recovery system.

As described above, the gas separation system 100 uses helium purge gas to flush the xenon from the column 102. When such a system 100 is used in combination with the arrangements shown in FIGS. 4 and 5 for concentrating the xenon within the effluent stream, clearly it would be desirable to utilise a single source of purge gas, rather than utilising two separate sources. Such an arrangement is shown in FIG. 9, in which helium (or hydrogen) purge gas is supplied from a single source 78 both to the storage vessels 62, 64 for regenerating the absorbent material 74 contained within, and to the column 102 for flushing the xenon from the column 102. In this arrangement, the helium supply conduit 112 is in fluid communication with the helium supply conduit 82 so that purge gas can be supplied to the column 102 from the buffer tank 80. The compressor 136 is in fluid communication with the buffer tank 80 to return purge gas exhaust from the outlet of the storage vessel 128 to the buffer tank 80. A conduit 170 conveys purge gas exhaust from the first outlet 142 from the second gas separator 104 back to the conduit 50 for combination with the effluent stream and/or use in regenerating the adsorbent material 74 within the storage vessels 62, 64 so that the purge gas exhaust from the first outlet 142 is retained within the gas recovery system.

Figure 10:
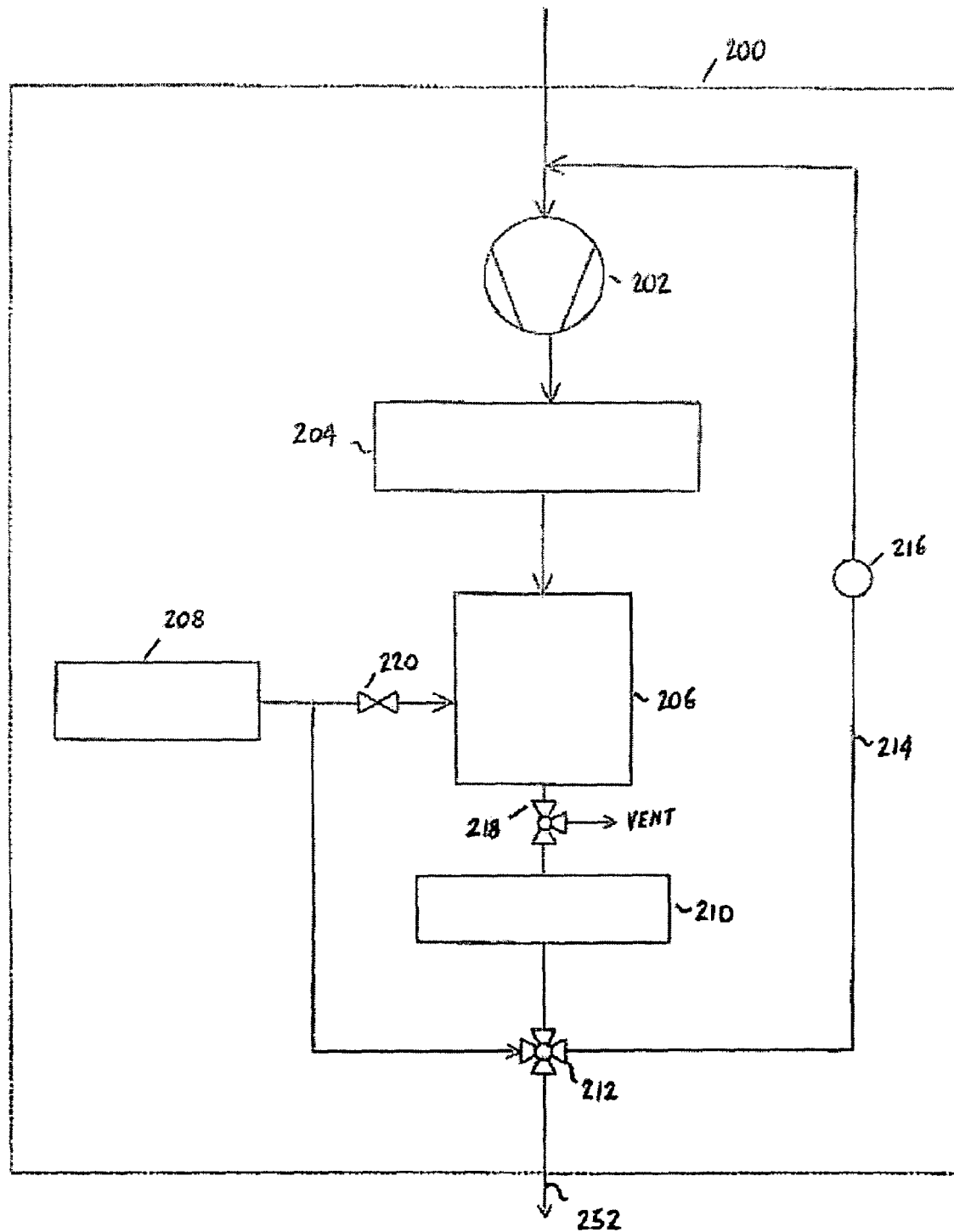
FIG. 10 illustrates schematically an example of a purifier for use in the gas recovery system.

The first gas stream is conveyed from a second outlet 144 of the membrane device 104 to a storage and delivery module 200. With reference to FIG. 10, the storage and delivery module 200 comprises a compressor 202 for compressing the first gas stream and exhausting the compressed gas stream to a drier 204 for removing any moisture transferred to the gas stream from the compressor 202. The drier 204 may be a gel or zeolite-based drier. From the drier 202 the gas stream passes to a storage vessel 206 for storing the xenon for return to the process chamber 10. In the event that the amount of xenon within the storage vessel 206 falls below a predetermined value, a source 208 of fresh xenon may be provided for supplying fresh xenon directly to the storage vessel 206. The storage vessel 206 and xenon source 208 may be, as illustrated, separate from the xenon source 18 and buffer tank 20. Alternatively, the xenon source 18 and buffer tank 20 may be omitted, with xenon being originally supplied to the chamber 10 from the storage vessel 206.

The xenon output from the storage vessel 206 passes through a gas polisher 210, which contains getter material for reacting with any impurities, such as $C_2F_6$ and hydrocarbons, remaining in the gas stream. The gas polisher 210 outputs a gas stream typically comprising xenon with a purity of at least 99.9%, more typically at least 99.99% purity, with a trace of helium.

To enable the purity of the xenon output from the gas polisher 210 to be checked, a valve 212 is provided for selectively outputting part of the xenon to a recirculation conduit 214 containing a suitable detector 216 for detecting the purity of the xenon output from the storage vessel 206. As shown in FIG. 10, xenon may be selectively conveyed to the recirculation conduit 214 from the xenon source 208 via valve arrangement 212 to enable the detector 216 to be accurately calibrated. Xenon is conveyed from the detector 216 back to the compressor 202 so that any xenon passing through the recirculation conduit 214 is retained in the module 200, and subject to further purification. In the event that the purity of the xenon output from the storage vessel 206 is below a predetermined level, the controller 23 controls the valve arrangement 212 to connect the xenon source 208 to the gas conduit 252 extending between the module 200 and the mass flow controller 22. The controller 23 may open the valve 220 in the storage and delivery module 200 to supply fresh xenon to the storage vessel 206, thereby increasing the purity of the xenon within the storage vessel 208. The valve arrangement 212 can be controlled to continue to convey xenon from the storage vessel 206 to the recirculation conduit 214 so that the purity of the xenon output from the storage vessel 206 may be continually re-assessed. In the event that the purity becomes equal to or greater than the predetermined level, the valve arrangement 212 is controlled to supply xenon from the storage tank. In the event that the purity of the xenon is severely compromised, for example, due to failure of one of the components of the system 60, xenon may be vented from the storage vessel 206 to the atmosphere using three-way valve 218, and the storage vessel 206 subsequently filled from the xenon source, thereby maintaining the purity of the xenon returned to the chamber by the system 60.

Figure 11:
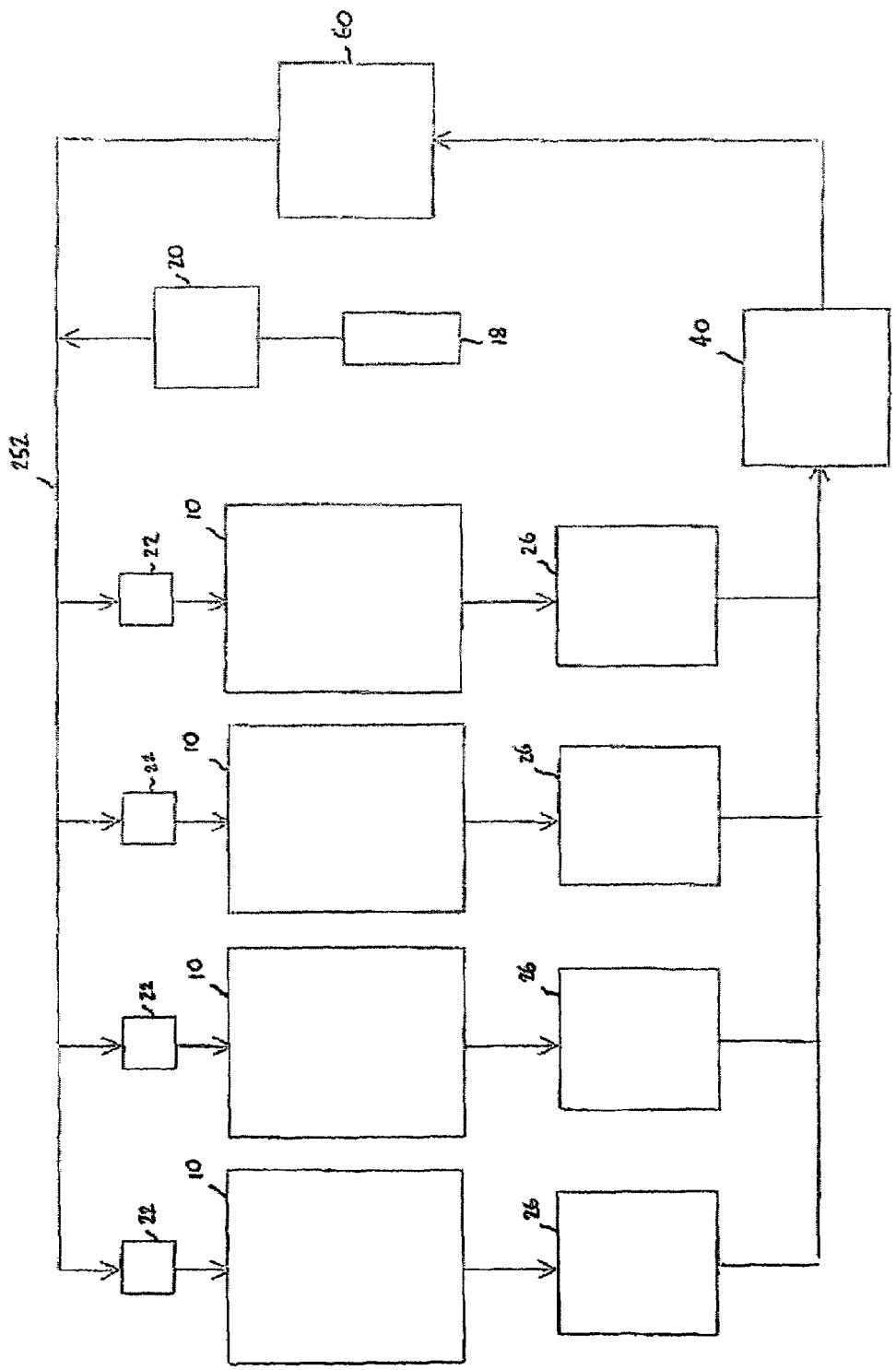
FIG. 11 illustrates schematically another example of a system incorporating a gas recovery system.

The gas recovery system 60 may be used to recover noble gas supplied to a plurality of process chambers 10. FIG. 11 illustrates an example where the gas recovery system 60 is provided for the recovery of noble gas supplied to four process chambers 10. In this example, gas is exhaust from each of the process chambers 10 using a respective pumping system 26, with each of the pumping systems 26 exhausting gas to a common abatement device 40. The abatement device 40 and the gas recovery system 60 are scaled in size to deal with the increased gas flows.

While the foregoing description and drawings represent the preferred embodiments of the present invention, it will be apparent to those skilled in the art that various changes and modifications may be made therein without departing from the true spirit and scope of the present invention.

The invention claimed is:

1. A method of recovering a noble gas from a gas mixture including the noble gas comprising:
    supplying the gas mixture to a gas chromatography column;
    separating the components of the gas mixture;
    exhausting other components of the gas mixture from the gas chromatography column;
    providing a purge gas to the chromatography column to draw the noble gas therefrom;
    exhausting a second gas mixture of noble gas and purge gas from the chromatography column;
    conveying the second gas mixture to a first separator comprising an adsorbent material;
    selectively adsorbing the noble gas using the adsorbent material and exhausting a purge gas-rich gas stream from the first separator;
    desorbing the noble gas from the adsorbent by evacuation or thermal regeneration to obtain a third gas mixture;
    conveying the third gas mixture to a second separator comprising a membrane separator; and
    separating the third gas mixture into a noble gas-rich stream and a noble gas-lean gas stream.

2. The method according to claim 1 further comprising conveying the purge gas-rich gas stream from the first separator to a storage vessel and supplying the purge gas from the storage vessel to the gas chromatography column.

3. The method according to claim 2 wherein the noble gas-lean gas stream is conveyed from the second separator to the storage vessel.

4. The method according to claim 1 wherein providing the purge gas comprises supplying the purge gas in one of an up-flow direction or a down-flow direction through the chromatography column.

5. The method according to claim 1 wherein the noble gas is xenon, krypton, or a mixture thereof.

6. A method of recovering a noble gas from a gas mixture including the noble gas comprising:
    supplying the gas mixture to a gas chromatography column;
    separating the components of the gas mixture;
    exhausting other components of the gas mixture from the gas chromatography column;
    providing a purge gas comprising helium or hydrogen to the chromatography column to draw the noble gas therefrom;
    exhausting a second gas mixture of noble gas and purge gas from the chromatography column;
    conveying the second gas mixture to a first separator comprising an adsorbent material;
    selectively adsorbing the noble gas using the adsorbent material and exhausting a purge gas-rich gas stream from the first separator;
    desorbing the noble gas from the adsorbent by evacuation or thermal regeneration to obtain a third gas mixture;
    conveying the third gas mixture to a second separator; and
    separating the third gas mixture into a noble gas-rich stream and a noble gas-lean gas stream.

7. A method of recovering a noble gas from a gas mixture including the noble gas comprising:
    supplying the gas mixture to a gas chromatography column from one of a plurality of storage vessels for sequentially receiving a waste gas comprising the gas mixture;
    separating the components of the gas mixture;
    exhausting other components of the gas mixture from the gas chromatography column; and
    collecting the noble gas noble gas from the chromatography column.

8. The method according to claim 7 wherein the waste gas is compressed prior to storage within one of the storage vessels.

9. The method according to claim 7 wherein the noble gas is selectively adsorbed on an adsorbent provided within each storage vessel.

10. The method according to claim 9 wherein the noble gas is desorbed from the adsorbent by evacuation, purging and/or thermal regeneration.

11. The method according to claim 9 further comprising providing purge gas to the storage vessels to regenerate the adsorbent material.

12. The method according to claim 7 wherein the waste gas is treated in an abatement device prior to storage in one of the storage vessels.

13. The method according to claim 12 wherein the abatement device comprises a reactant for reacting with at least one of the components of the waste stream.

14. Apparatus for recovering a noble gas from a gas mixture comprising:
    a gas chromatography column for separating the components of the gas mixture and sequentially exhausting the components therefrom, the gas chromatography column configured such that the other components of the gas mixture are exhausted from the gas chromatography column before the noble gas;
    means to supply a purge gas to the gas chromatography column to draw the noble gas therefrom;
    a first separator for receiving a second gas mixture comprising the purge gas and the noble gas from the gas chromatography column and for separating the second gas mixture into a third gas mixture and a purge gas-rich gas stream, the first separator comprising an adsorbent material for selectively adsorbing the noble gas and exhausting the purge gas-rich gas stream;

means for desorbing the third gas mixture from the adsorbent by evacuation or thermal treatment;

a second separator comprising a membrane separator for receiving the third gas mixture and separating the third gas mixture into a noble gas-rich gas stream and a noble gas-lean gas stream; and means for collecting the noble gas-rich gas stream.

15. The apparatus according to claim 14 wherein the means for desorbing comprises means for evacuating the first separator.

16. The apparatus according to claim 14 further comprising means for heating the first separator to desorb the noble gas from the adsorbent.

17. The apparatus according to claim 14 further comprising a storage vessel for storing the purge gas-rich gas stream and means for conveying the purge gas-rich gas stream to the storage vessel.

18. The apparatus according to claim 17 further comprising means for conveying the noble gas-lean gas stream from the second separator to the storage vessel.

* * * * *